United States Patent [19]

Watson

[11] Patent Number: 4,755,939

[45] Date of Patent: Jul. 5, 1988

[54] GARBAGE COLLECTION IN A COMPUTER SYSTEM

[75] Inventor: Paul Watson, Chester-Le-Street, Great Britain

[73] Assignee: International Computers Limited, London, England

[21] Appl. No.: 934,439

[22] Filed: Nov. 24, 1986

[30] Foreign Application Priority Data

Dec. 4, 1985 [GB] United Kingdom ................ 8529890

[51] Int. Cl.$^4$ .............................................. G06F 11/00
[52] U.S. Cl. .................................................... 364/300
[58] Field of Search ... 364/200 MS File, 900 MS File, 364/300

[56] References Cited

U.S. PATENT DOCUMENTS 4,121,286 10/1978 Venton et al. ...................... 364/200
4,325,120 4/1982 Colley et al. ........................ 364/200

OTHER PUBLICATIONS

Alice-A Multi-Processor Reduction Machine for the Parallel Evaluation of Applicative Languages, Darlington et al., Proceedings of the ACM Conference on Functional Programming Languages and Computer Architecture, Oct., 1981.

Primary Examiner—Thomas M. Heckler
Attorney, Agent, or Firm—Lee & Smith

[57] ABSTRACT

A computer system is described, having memory cells organized in a directed graph structure by means of pointers. Each cell has a reference count, and each pointer has a weight value. If a new pointer to a cell is created by copying an existing pointer, the new and existing pointers are given weights whose sum equals the old value of the existing pointer. In this way, the sum of the weights of the pointers to any cell are maintained equal to its reference count. If a pointer is destroyed, the reference count of the cell to which it points is reduced by the weight of the pointer. Thus, when the reference count of a cell reaches zero, it is safe to assume that there are no more existing pointers to it, and hence that cell my be reclaimed (garbage-collected) for re-use.

10 Claims, 5 Drawing Sheets

GARBAGE COLLECTION IN A COMPUTER SYSTEM

This invention relates to garbage collection in a computer system. The invention is particularly, although not exlusively, concerned with systems of the kind designed to execute declarative (or applicative) languages. One such system is described, for example in "ALICE—a multiprocessor reduction machine for the parallel evaluation of applicative languages" by J. Darlington and M. Reeve, Proceedings of the ACM Conference on Functional Programming Languages and Computer Architecture, October 1981.

In such a system, a computation is usually represented by a directed graph, the nodes of which are formed by units of information sometimes referred to as cells or packets. Each cell may hold pointers to other cells, representing the connections between the nodes of the graph.

In such a system, it is important to provide some means of reclaiming cells which are no longer required, so that they can be re-allocated for further use. This procedure is generally referred to as garbage collection. A cell can be considered to be no longer required if it is not reachable from any other cell in the graph i.e. if there are no pointers to it from any other active cells.

One garbage collection method that has been proposed (see for example the ALICE paper referred to above) is to include a reference count in each cell, indicating the number of other cells that include a pointer to that cell. Whenever a new pointer to a cell is created, the reference count of the cell is incremented by one, and whenever an existing pointer is destroyed the reference count of the cell to which it points is decremented by one. Cells whose reference count becomes equal to zero are reclaimed e.g. by adding them to a list of free cells. However, this garbage collection method can lead to problems. One of these problems can be illustrated by reference to FIGS. 1a to 3d of the accompanying drawings.

FIGS. 1a–1c show a part of a directed graph structure at three successive instants. In FIG. 1a, a cell A contains a pointer to another cell P, and the reference count of cell P is set to 1. In FIG. 1b, a new cell B has been created, and has copied the pointer in Cell A, so that this new cell also points to cell P. Hence, the reference count is incremented to 2. In FIG. 1c, the cell B has been destroyed, and so the reference count of cell P is now decremented by one.

FIG. 2 shows a multi-processor distributed computer system, capable of executing a declarative language. The system comprises a plurality of processors (processor 1, processor 2 etc) interconnected by a switch which allows messages to be passed between the processors. Each processor includes a memory, for holding programs and cells.

In such a system, different cells in a graph structure may reside in different processors. For example, cells A and P may reside in the memory of processor 1, while cell B resides in the memory of processor 2. In this situation, when cell B is created, it is necessary for processor 2 to send a message to processor 1, telling it to increment the reference count of cell P. Similarly, when cell B is destroyed, it is necessary to send a second message telling processor 1 to decrement the reference count of cell P. Both of these messages take a finite time to reach the first processor, and it may happen that the second message may be acted upon before the first.

FIGS. 3a–3d shows what happens if the messages are acted upon in the wrong order. FIG. 3a shows the same initial situation as in FIG. 1a. In FIG. 3b, cell B has been created, with a pointer to cell P. However, the message to update the reference count of cell P has not yet arrived. In FIG. 3c, cell B has been garbage collected, and the corresponding message to decrement the reference count of cell P has arrived; the reference count of P is therefore now zero. Finally, in FIG. 3d, the first message has now arrived, causing the reference count of cell P to be incremented to one.

It can be seen that in FIG. 3c the reference count is incorrectly reduced to zero. If a garbage collection occurs while the situation of FIG. 3c exists, cell P would be garbage collected in error, and from then on the graph would be incorrect.

One object of the present invention is to avoid this problem.

SUMMARY OF THE INVENTION

According to the invention, there is provided a computer system having storage means containing a plurality of memory cells, at least some of which contain pointers to others of the cells thereby defining a directed graph structure in which each cell represents a node of the graph, wherein (a) each pointer has a variable weight value associated with it,
(b) each cell contains a variable reference count value,
(c) whenever a cell is allocated in the storage means, its reference count is initially set to a predetermined value and the weights of any pointers to that cell are set to non-zero values such that the sum of those weights (or the weight if there is only one such pointer) is equal to the reference count of that cell,
(d) whenever a new pointer to a cell is created by copying an existing pointer, the new pointer and the existing pointer are given non-zero weight values whose sum equals the old weight value of the existing pointer, but the reference count of the cell is unaltered,
(e) whenever a pointer is destroyed, the reference count of the cell to which it points is reduced by the weight of that pointer, and
(f) Cells with reference count equal to zero are reclaimed.

It can be seen that, in such a system, since the reference count is only ever decremented from its initial value (never incremented), the ordering of updates to the reference count is unimportant, and that when the reference count of a cell reaches zero it is safe to assume that there are no more pointers to that cell.

In one particular form of the invention, the weight value of each pointer is chosen to be a power of two, and whenever a pointer is created by copying an existing pointer of weight greater than one, the weight of the existing pointer is divided by two and the result is stored as the weight value of the new and existing pointers. Since the weight value is always a power of two, it can conveniently be encoded in a compressed form as the logarithm to the base two of the weight.

If the weight value reaches one, it is not possible to divide it again by two. This problem can be overcome by creating a dummy cell, into which the existing pointer is copied along with its weight ($=1$). The dummy cell is then given a reference count equal to a power of two (greater than one) and the new and existing pointers are both made to point to this dummy cell, and are given weights equal to one-half of its reference count.

DESCRIPTION OF AN EMBODIMENT OF THE INVENTION

A distributed computer system in accordance with the invention will now be described by way of example.

Figure 1A:
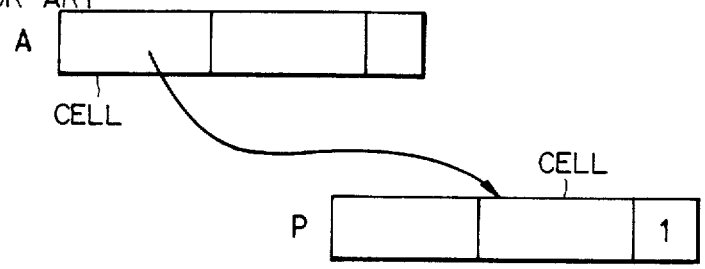
FIGS. 1a-1c and 3a-3d show part of a directed graph structure, and illustrate a problem which arises with the reference count method of garbage collection, as described above.
Figure 1B:
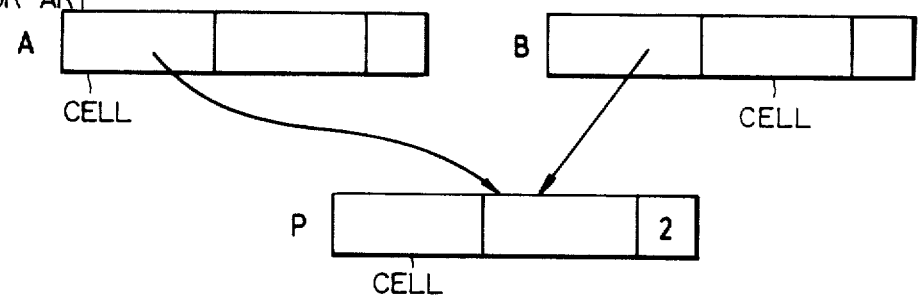
Figure 1C:
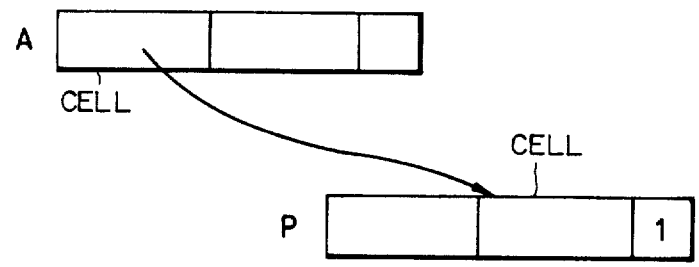
Figure 2:
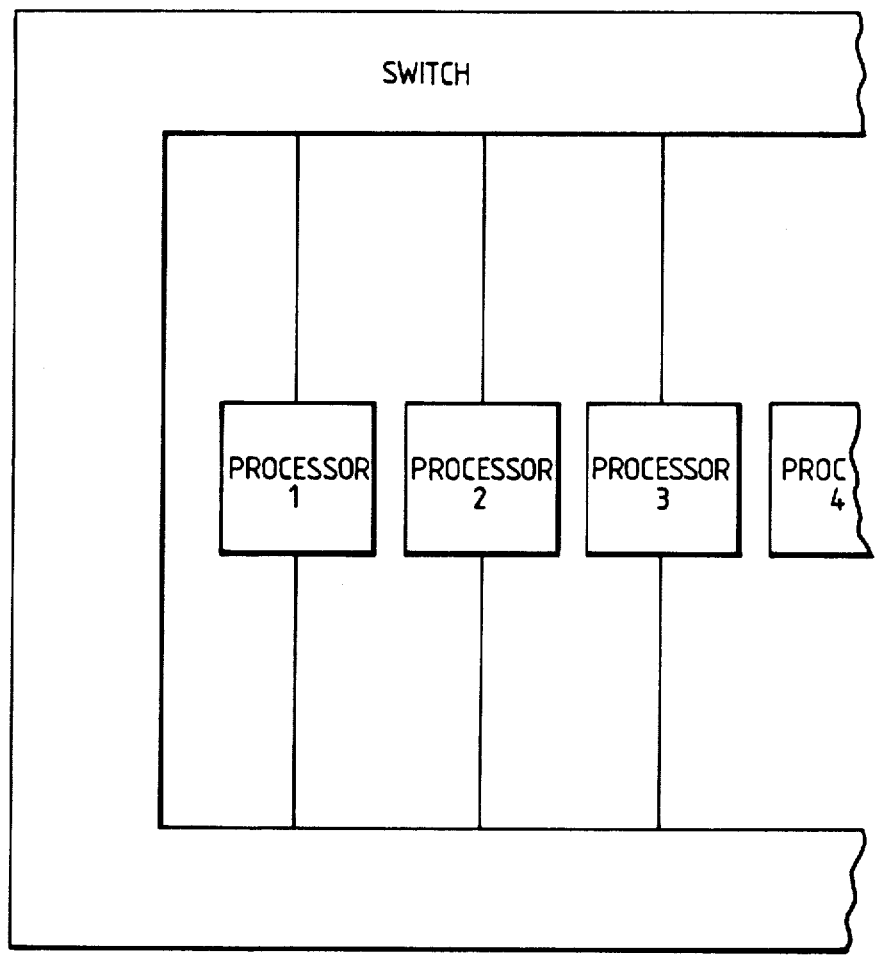
FIG. 2 shows a distributed multi-processor computer system.
Figure 3A:
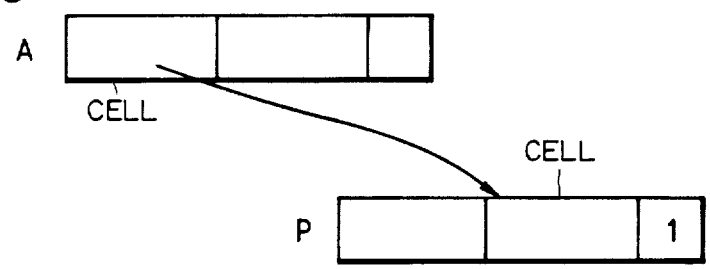
Figure 3B:
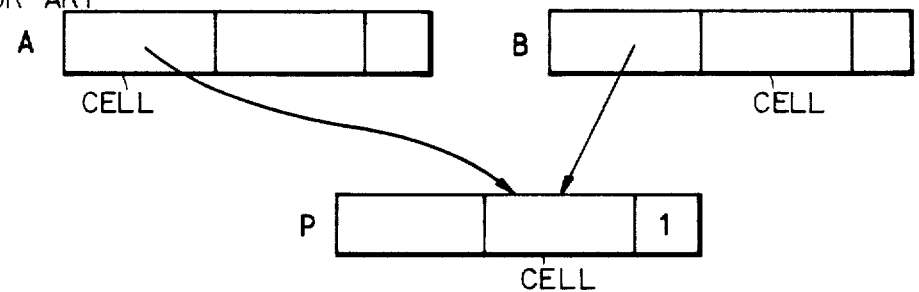
Figure 3C:
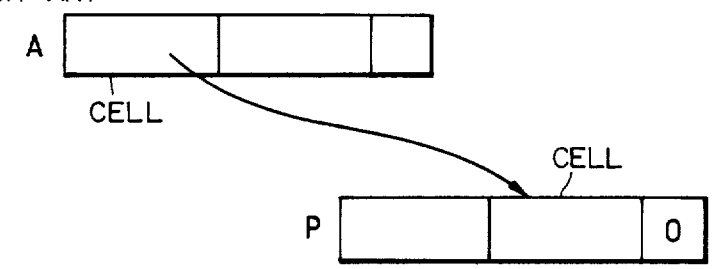
Figure 3D:
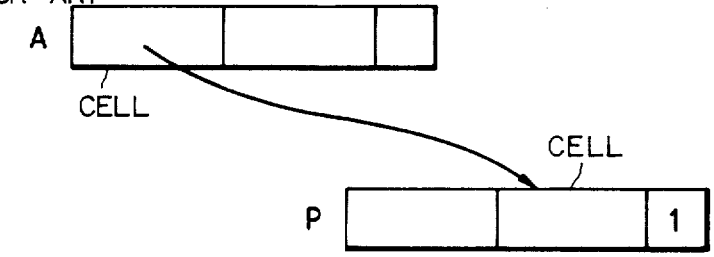

The system is basically as shown in FIG. 2, and may for example be similar to that described in the ALICE paper referred to above. In the system, declarative language programs are executed in a known manner, by manipulating directed graph structures. The graph structures are represented by memory cells, containing pointers representing the connections between the nodes of the graph. Each cell has a reference count field. Whenever the reference count of a cell becomes zero, that cell becomes a candidate for garbage collection.

The system differs from known systems as follows:

Each pointer has a weight field associated with it, holding a weight value for the pointer. When a cell is allocated, it is given an initial reference count equal to the maximum power of two that can fit into the reference count field. At the same time, assuming there is just one pointer pointing to the cell, that pointer is given a weight value equal to the reference count of the cell.

Whenever a new pointer is created by copying an existing pointer, the weight value of the existing pointer is divided by two and the result is stored as the weight value of both the new and existing pointer. However, the reference count of the cell to which they point is unaltered.

Whenever a pointer is destroyed, the weight value of that pointer is subtracted from the reference count of the cell to which it points. A test is then performed to see if the reference count is now zero. If it is, the cell is reclaimed by adding it to a list of free cells.

Figure 4A:
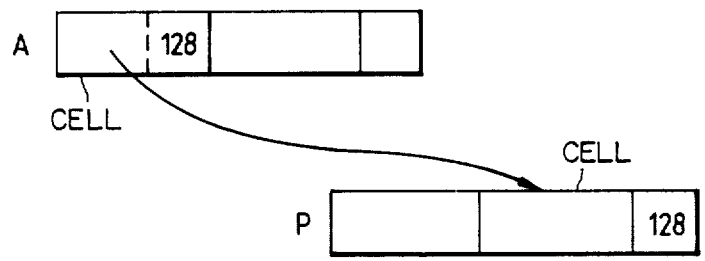
FIGS. 4a-4c and 5a-5b show parts of directed graph structures, illustrating the operation of an embodiment of the invention.
Figure 4B:
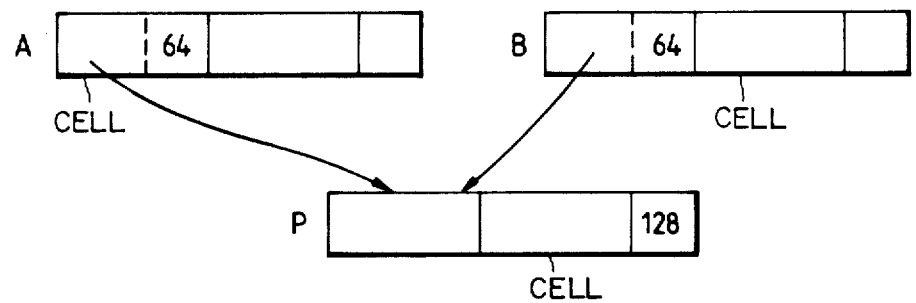
Figure 4C:
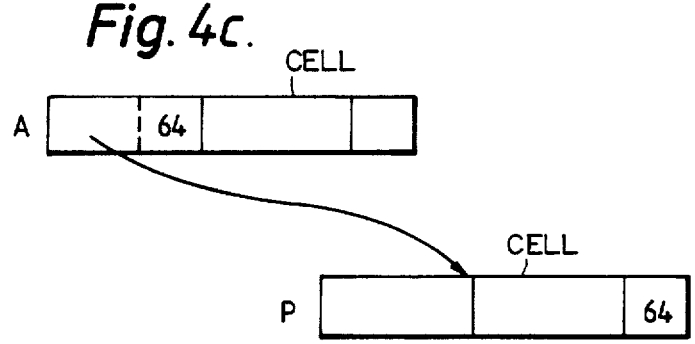

Referring to FIGS. 4a-4c, these show an example of the way in which the reference counts and weight values are used. It is assumed in this example that the reference count field is eight bits wide.

FIG. 4a shows a cell A containing a pointer to a cell P. When cell P is allocated, it is given an initial reference count equal to 128 ($=2^7$) which is the maximum power of two that can fit into the eight-bit reference count field. At the same time, the pointer in cell A is given a weight value equal to the reference count of cell P (128).

In FIG. 4b, a new cell B has been created, with a copy of the pointer in cell A. The weight value of the pointer in cell A is divided by two, and the result (64) is then stored in cells A and B as the weight value of the pointers. The reference count of cell P remains unchanged at 128.

In FIG. 4c, cell B has been destroyed. The weight value of the pointer in cell B is therefore subtracted from the reference count of cell P to give a reference count of 64, Since the weight values are always equal to powers of two, they can conveniently be encoded in logarithmic form, i.e. the number stored in the weight field of each pointer is the logarithm to the base two of the actual weight value. For example, in FIG. 4a, the weight 128 of the pointer in cell A would be encoded as 7 ($=\log_2 128$) and in FIG. 4b the weight 64 would be encoded as 6 ($=\log_2 64$). It can be seen, therefore, that the weight field need only be three bits wide since the greatest number it is required to hold is 7.

When the weight values are encoded in this way, the division of a weight value by two is performed by subtracting one from the logarithmically encoded value of the weight. Also, when a pointer is destroyed, it is necessary to take the antilogarithm of its encoded weight value before subtracting it from the reference count of the cell to which it points. This can be implemented by shifting "1" left by a number of places equal to the weight value. Alternatively, it could be performed by table look-up or by dedicated logic.

Figure 5A:
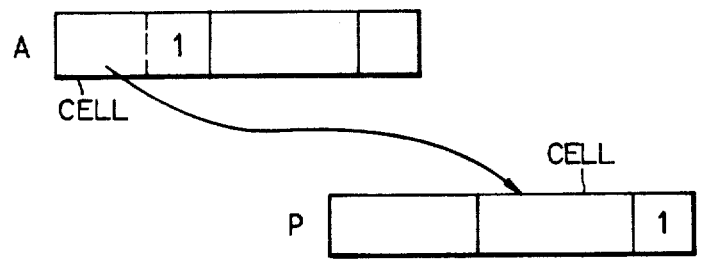
Figure 5B:
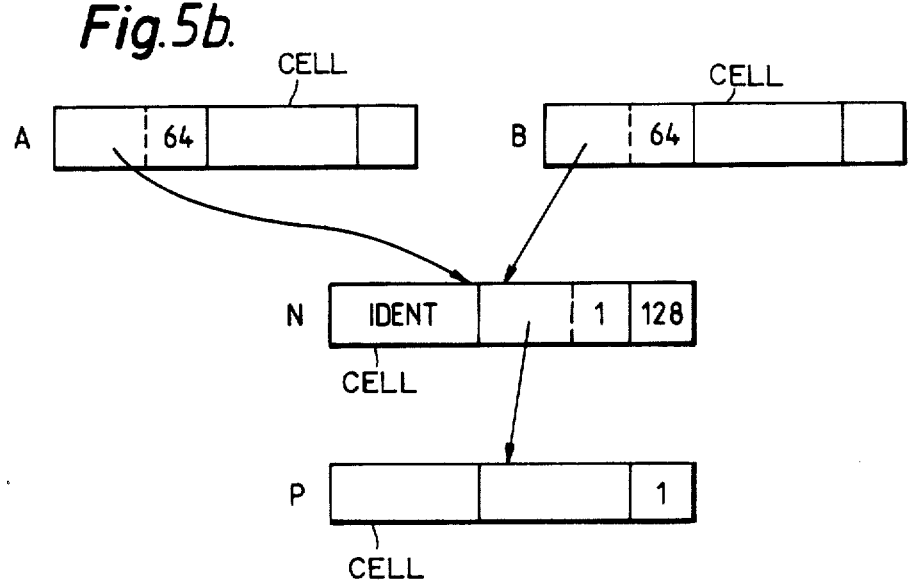

If the sub-division of the pointer weights continues, the weight of a particular pointer may be reduced to one. It is then not possible to subdivide the weight again. FIGS. 5a-5b show how this problem can be solved. It is assumed that cell A has a pointer to cell P, with a weight of 1 (FIG. 5a). Suppose that a new cell B is now created, with a copy of the pointer in cell A. As shown in FIG. 5b, a dummy cell N is created, containing an IDENTITY operator i.e. one that has no effect on the calculation. The cell N is given a pointer to cell P with a weight equal to 1, and the reference count of cell N is set to the maximum value of 128. At the same time, the pointers in cells A and B are both set to point to cell N, and are given weight values equal to one half the reference count of cell N (i.e. 64).

Thus, it can be seen that the dummy cell N provides a level of indirection which allows the subdivision of the weight value to continue.

Although the specific embodiment of the invention is described above in the context of a distributed computer system, the invention is also applicable to single processor systems. In particular, the invention is useful in a single processor system having a main store and a larger but slower secondary store. Consider the case where a cell is created in the main store, and points to a cell in the secondary store. If a conventional reference—count system if used, it is necessary to access the secondary store to increment the reference count of the pointed-to cell. In contrast, with a reference count scheme in accordance with the present invention, it is not necessary to change the reference count of the pointed-to cell in this situation, and therefore a costly secondary store access is avoided.

The invention is also useful in overcoming a problem in conventional reference-count garbage collection: what to do if the reference count of a cell needs to be increased and it is already at its maximum value. In a reference-count scheme in accordance with the invention, this never occurs, and the equivalent problem of what to do if a pointer to be copied has a weight of 1 has been solved, as described above.

In the specific embodiment of the invention described above, the weights of the pointers are represented as powers of 2. However, other schemes for representing the weights are possible. For example, Fibonacci numbers could be used. The reference count of a new cell would be set at some Fibonacci number (say the nth in the series) and when the pointer to that cell was copied, the copy would be given a weight equal to the n−1th Fibonacci number, whilst the weight of the copied pointer would be replaced by the n−2th Fibonacci number. Weights would therefore always be Fibonacci numbers and so they could be given a compact representation by representing the nth Fibonacci number by n in the weight field.

Many other schemes for representing the weight values are also possible, such as the use of look-up tables to encode the elements of the series to a compacted form and to decode them. A table could also be used to provide the new weight values for use when a pointer is copied.

I claim:

1. A method of garbage collection in a computer system having storage means containing a plurality of memory cells, at least some of which contain pointers to others of the cells thereby defining a directed graph structure in which each cell represents a node of the graph, wherein the method comprises steps as follows:
    (a) each pointer is provided with a variable weight value,
    (b) each cell is provided with a variable reference count value,
    (c) whenever a cell is allocated in the storage means, the reference count of the cell is initially set to a predetermined value and the weights of any pointers to that cell are set to non-zero values such that the sum of those weights (or the weight if there is only one such pointer) is equal to the reference count of that cell,
    (d) whenever a new pointer to a cell is created by copying an existing pointer, the new pointer and the existing pointer are given non-zero weight values whose sum equals the old weight value of the existing pointer, but the reference count of the cell is unaltered,
    (e) whenever a pointer is destroyed, the reference count of the cell to which the pointer points is reduced by the weight of that pointer,
    (f) and cells with reference count equal to zero are reclaimed.

2. A method according to claim 1 wherein the weight of each pointer is a power of two, and wherein, whenever a pointer is created by copying an existing pointer of weight greater than one, the weight of the existing pointer is divided by two and the result is stored as the weight value of the new and existing pointers.

3. A method according to claim 2 wherein the weight of each pointer is encoded in a compressed form as the logarithm to the base two of the weight.

4. A method according to claim 3 wherein, whenever a pointer is to be created by copying an existing pointer of weight equal to one, a dummy cell is created into which the existing pointer is copied along with its weight, the dummy cell is given a reference count greater than one, and the new and existing pointers are both made to point to this dummy cell, and are given non-zero weights whose sum equals the reference count of the dummy cell.

5. A method according to claim 3 in which the system is a multi-processor distributed computer system.

6. A method according to claim 2 wherein, whenever a pointer is to be created by copying an existing pointer of weight equal to one, a dummy cell is created into which the existing pointer is copied along with its weight, the dummy cell is given a reference count greater than one, and the new and existing pointers are both made to point to this dummy cell, and are given non-zero weights whose sum equals the reference count of the dummy cell.

7. A method according to claim 2 in which the system is a multi-processor distributed computer system.

8. A method according to claim 1 wherein, whenever a pointer is to be created by copying an existing pointer of weight equal to one, a dummy cell is created into which the existing pointer is copied along with its weight, the dummy cell is given a reference count greater than one, and the new and existing pointers are both made to point to this dummy cell, and are given non-zero weights whose sum equals the reference count of the dummy cell.

9. A method according to claim 8 in which the computer system is a multiple-processor distributed computer system.

10. A method according to claim 1 in which the computer system is a multi-processor distributed computer system.